US010037074B2

(12) United States Patent
Goldsmith et al.

(10) Patent No.: US 10,037,074 B2
(45) Date of Patent: Jul. 31, 2018

(54) COMPUTER POWER MANAGEMENT BASED ON SENSOR DATA FROM REMOTE DEVICES

(71) Applicant: Google Inc., Mountain View, CA (US)

(72) Inventors: Benjamin Goldsmith, San Francisco, CA (US); Jennifer Shien-Ming Chen, San Francisco, CA (US); Alexander Friedrich Kuscher, San Francisco, CA (US)

(73) Assignee: Google LLC, Mountain View, CA (US)

( * ) Notice: Subject to any disclaimer, the term of this patent is extended or adjusted under 35 U.S.C. 154(b) by 246 days.

(21) Appl. No.: 14/850,880

(22) Filed: Sep. 10, 2015

(65) Prior Publication Data

US 2017/0075411 A1    Mar. 16, 2017

(51) Int. Cl.
 *G06F 1/00* (2006.01)
 *G06F 1/32* (2006.01)
(52) U.S. Cl.
 CPC .......... *G06F 1/3296* (2013.01); *G06F 1/3206* (2013.01); *G06F 1/3209* (2013.01); *G06F 1/3231* (2013.01); *Y02D 10/172* (2018.01); *Y02D 10/173* (2018.01)
(58) Field of Classification Search
 None
 See application file for complete search history.

(56) References Cited

U.S. PATENT DOCUMENTS

| | | | |
|---|---|---|---|
| 5,809,223 A * | 9/1998 | Lee | G06F 1/30 714/4.5 |
| 6,346,891 B1 | 2/2002 | Feinleib et al. | |
| 6,542,996 B1 * | 4/2003 | Chang | G06F 1/3203 713/300 |
| 7,881,749 B2 | 2/2011 | Hiles | |
| 8,806,378 B2 | 8/2014 | Schwarzberg et al. | |
| 8,855,667 B2 | 10/2014 | Lada et al. | |
| 2004/0032605 A1 * | 2/2004 | Regimbal | H04N 1/00087 358/1.13 |
| 2008/0082845 A1 * | 4/2008 | Morisawa | G06F 1/3203 713/323 |
| 2008/0270814 A1 * | 10/2008 | Starr | G06F 1/3203 713/323 |
| 2009/0119527 A1 * | 5/2009 | Kim | G06F 1/3203 713/323 |

(Continued)

FOREIGN PATENT DOCUMENTS

EP        2315101 B1    1/2014
WO   WO-2012/037249 A1    3/2012

*Primary Examiner* — Nitin Patel
(74) *Attorney, Agent, or Firm* — McDermott Will & Emery LLP

(57) ABSTRACT

A method is disclosed for performing actions in a computing device based on sensor data from remote devices. While in a power-savings mode, the computing device monitors for activity associated with a mobile device. Based on the monitoring for activity data, the computing device receives an indication that a user of the mobile device intends to use the computing device. Based on the indication, the computing device switches from the power-saving mode to a warming mode, the warming mode comprising restoring power to the one or more components and initiating loading the operational state of the computing device before the user physically interacts with the computing device.

20 Claims, 5 Drawing Sheets

(56) References Cited

U.S. PATENT DOCUMENTS

| | | |
|---|---|---|
| 2009/0217026 A1 | 8/2009 | Chuang et al. |
| 2011/0055606 A1 | 3/2011 | Wu et al. |
| 2011/0312286 A1 | 12/2011 | Lin et al. |
| 2014/0195839 A1 | 7/2014 | Chueh et al. |
| 2014/0364104 A1 | 12/2014 | Wood et al. |
| 2015/0262696 A1* | 9/2015 | Sakata ................ G06F 12/0868 365/185.18 |
| 2016/0183029 A1* | 6/2016 | Kang .................... G06Q 50/22 455/41.2 |

* cited by examiner

COMPUTER POWER MANAGEMENT BASED ON SENSOR DATA FROM REMOTE DEVICES

BACKGROUND

To save battery power, laptops and other portable computing devices may turn off their screen or go into a suspend mode after a predetermined period of time of being idle. A computing device does not consider a user's actual intention to use the computer within that period of time. Moreover, when a device is truly not being used, there may be a period of time in which the device is operating at full power, unnecessarily draining power resources. Additionally, once the computer enters the suspended mode, the computing device may require a substantial amount of time to reload its state before it may be used again by the user.

SUMMARY

The subject technology provides a system and computer-implemented method for performing actions in a computing device based on sensor data from remote devices. In one or more implementations, the method comprises placing a computing device in a power-saving mode, the power-saving mode comprising saving an operational state of the computing device in connection with limiting power to one or more components of the computing device, monitoring, while in the power-saving mode, a network for activity data associated with a mobile device, receiving, based on the monitoring for activity data, a first indication that a user of the mobile device intends to use the computing device, and switching, based on the first indication, the computing device from the power-saving mode to a warming mode, the warming mode comprising restoring power to the one or more components and initiating loading the operational state of the computing device before the user physically interacts with the computing device. Other aspects include corresponding systems, apparatuses, and computer program products for implementation of the computer-implemented method.

In one or more implementations, the method comprises placing a computing device in a normal mode, the normal mode comprising components of the computing device being powered, and an operational state of the computing device being loaded into memory systems of the computing device, in accordance with normal operation of the computing device, receiving, at the computing device, user interaction associated with a user, the user being associated with a mobile device, monitoring, while in the normal mode, a network for activity data associated with the mobile device, receiving, based on the monitoring for activity data, a first indication that the user intends to discontinue use of the computing device, and switching, based on the first indication, the computing device from the normal mode to a power-saving mode, wherein the power-saving mode comprises saving the operational state of the computing device in connection with limiting power to one or more of the components of the computing device. Other aspects include corresponding systems, apparatuses, and computer program products for implementation of the computer-implemented method.

In one or more implementations, a machine-readable medium includes instructions stored thereon that, when executed by a computing device, cause the computing device to place the computing device in a power-saving mode, the power-saving mode comprising saving an operational state of the computing device in connection with limiting power to one or more components of the computing device, monitor, while in the power-saving mode, a network for activity data associated with a mobile device, receive, based on the monitoring for activity data, a first indication that a user of the mobile device intends to use the computing device, and switch, based on the first indication, the computing device from the power-saving mode to a warming mode, the warming mode comprising restoring power to the one or more components and initiating loading the operational state of the computing device before the user physically interacts with the computing device. Other aspects include corresponding methods, systems, apparatuses, and computer program products for implementation of the machine-readable medium.

It is understood that other configurations of the subject technology will become readily apparent to those skilled in the art from the following detailed description, wherein various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative in nature and not as restrictive.

BRIEF DESCRIPTION OF THE DRAWINGS

A detailed description will be made with reference to the accompanying drawings.

DETAILED DESCRIPTION

Figure 1:
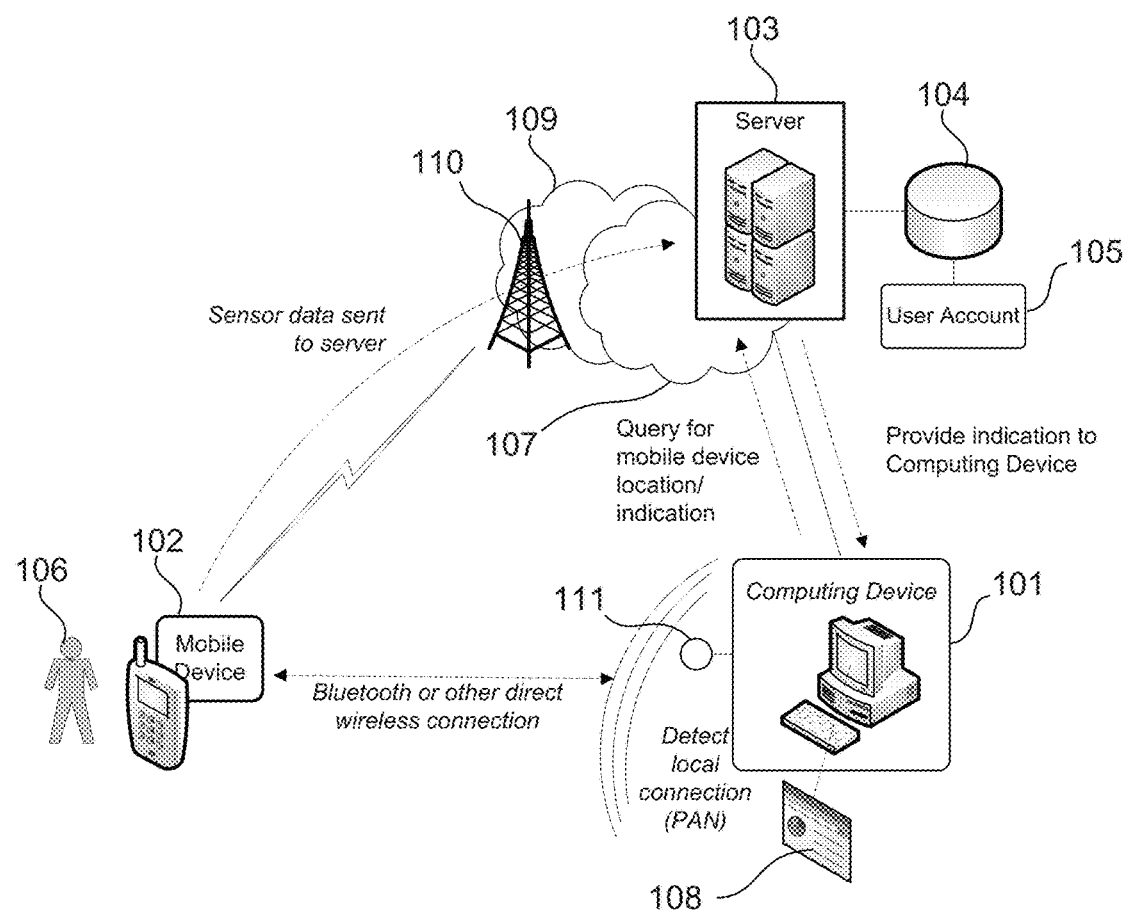
FIG. 1 depicts example computing device, including example components for performing actions in a computing device based on sensor data from remote devices.

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, it will be clear and apparent to those skilled in the art that the subject technology is not limited to the specific details set forth herein and may be practiced without these specific details. In some instances, well-known structures and components are shown in block diagram form in order to avoid obscuring the concepts of the subject technology.

The subject technology provides a computer-enabled system and method for performing actions in a computing device (e.g., a laptop) (including, e.g., power management actions) based on sensor data from remote devices. A mobile device (e.g., a smartphone) is equipped with a location sensor such as a GPS and one or more motion sensors including, e.g., an accelerometer. The mobile device is connected to the computing device over a network. The network may encompass one or more of a local area network, WiFi, wide area network, personal area network (e.g., using Bluetooth), etc. In one or more implementations, the computing device and mobile device are linked to the same user account via the network of the Internet.

The computing device is configured to switch between a power-savings mode, a warming mode, and a normal mode depending on activity data it receives from the mobile device via the network. The activity data is compiled from sensors integrated with the mobile device (and other devices linked to the account) and provide an indication as to whether the user of the mobile device is intending to use or not use the computing device. For example, the activity data may include a user location based on a global positioning system (GPS), and the computing device may determine whether the user intends to use the computing device based on whether the user location indicates that the user is moving toward or away from the computing device. In this regard, the computing device, if in a power-saving mode, may wake up as the mobile device moves closer to the computing device, or enter the power-savings mode as the mobile device moves away from the computing device.

When switching from a normal mode to a power-savings mode, the computing device may limit or restrict power to certain components and save the operational state in a persistent memory. While in the power-savings mode, network circuitry (e.g., a wireless network adaptor) of the computing device may be activated without activating other components of the device. For example, the screen, main processor, and storage drives may remain powered-down in the power-saving mode. The network circuitry may also be powered-down but periodically activated solely to connect to an access points near the computing device and to query a server to receive the activity data.

When the computing device is in the power-saving mode and receives activity data providing an indication that a user of the mobile device intends to use the computing device, the computing device switches from the power-saving mode to a warming mode. In this mode power is restored to any powered-down components and the operational state of the computing device is loaded before the user physically interacts with the computing device. Application updates may also be initiated, including software version updates, patches, as well as the download of user-notifications, emails, etc. Accordingly, all virtual assets required to begin using the device are loaded into memory, and any initial activities required to place the computing device into normal operational mode are performed.

In one or more implementations, activity data may be used to identify behavior patterns representative of when the computing device is expected to be activated. For example, sensor data may be correlated (e.g., by the server) with computing device usage times to determine patterns of sensor readings (e.g., in addition to location) leading up to use of the computing device. During the power-saving mode, the stored behavior patterns may be used to awaken the computing device before a predicted use of the device so that warming activities may be performed and application updates and content may be downloaded in expectation of the device being used. In one or more implementations, e.g., an update may be replicated to the computing device based on a like update to the mobile device and an indication that the user intends to use the computing device. In this manner, battery life is preserved and the user experience enhanced by making the computing device for ready for use in an up-to-date state when the user intends to use the device FIG. 1 is a diagram of an example system 100 for performing actions in a computing device based on sensor data from remote devices, according to one or more aspects of the subject technology. A system 100 may include one or more computing devices 101, 102 (e.g., a smartphone, tablet or notebook computer, personal computer. PDA, etc.), one or more centralized servers 103, and a remote storage 104 (e.g., a database).

According to various implementations, computing devices 101 and 102 may be tied to a user account 105. Accordingly, a user 106 is authorized to use certain features of a respective device 101, 102 by authenticating to user account 105. Additionally, as will be described further, each device 101, 102 may be authorized to influence the control of certain hardware and/or software features of the other device(s) by way of being associated with and/or authenticating to user account 105.

User account 105 may be, e.g., a cloud-based or web-based user account or may be an enterprise account (e.g., LDAP account), and may function as a universal account for multiple devices. In this regard, information stored in connection with the user account may be centrally located on a third computing device, e.g., on a server 103 (e.g., in a "data cloud").

The various connections between computing devices 101 and 102, server 103, and storage 104 may be made over a wired or wireless connection. Server 103 may be operably connected to, e.g., first and second computing devices 101, 102 over a network 107. Network 107 may be a WAN, LAN, or any other network consisting of one or multiple networking technologies (such as satellite, cellular, cable, DSL, optical network, Ethernet over twisted pairs, and others), and which deploys one or multiple networking protocols for transferring data. Network 107 may also include, but is not limited to, any one or more of the following network topologies, including a bus network, a star network, a ring network, a mesh network, a star-bus network, a tree or hierarchical network, etc. Network 302 may also be a wireless personal area network that is created using, e.g., Bluetooth, Bluetooth Low Energy, infrared, IrDA, Wireless USB, etc.

Remote storage 104 may store information in connection with user account 105. As will be described further, remote server may store activity data collected from device 102 and/or user-interaction data collected from device 101. The functionality of server 103 and remote storage 104 may be implemented on the same physical server or distributed among a plurality of servers. Moreover, remote storage 104 may take any form such as relational databases, object-oriented databases, file structures, text-based records, or other forms of data repositories.

According to various aspects, computing devices 101 and 102 may be configured to load and execute one or more user interfaces 108 for interaction with one or more software applications, including web-applications provided by, e.g., server 103. A user interface 108 may include an interface provided by a desktop or mobile operating system, or an interface provided by a stand-alone application (e.g., a web-browser or web-enabled application) executing on the device and managed by the operating system.

As depicted in FIG. 1, computing device 102 may be operably connected to network 107 and/or server 103 by way of a mobile network 109. Mobile network 109 may be part of, or operably connected to network 107 such that data received from device 102 is transmitted to network 107 via mobile network 109 and then transmitted to server 103 using network 107. Mobile network 109 may include one or more wireless stations 110 for wirelessly communicating with device 102 or other similarly situated devices. A wireless station 110 may be, e.g., a local WiFi base station, wireless personal area network, or, in some aspects, a cell site (including a cell tower or antennae, or radio receiver/transmitter).

Computing device 101 may be configured with a wireless access point 111 (e.g., Bluetooth or Bluetooth Low Energy hardware) for establishing a direct wireless connection with devices over a personal area network. Using wireless access point 111, primary computing device 101 may be configured to detect when device 102 is present within a predetermined range of access point 111, and to connect to device 102 when authorized. For example, software operating on device 101 may broadcast, over wireless access point 111, a code which when interpreted by corresponding software on a receiving device identifies device 101 as a computing device available for connection with other devices, e.g., that are associated with a particular type of user account. In various implementations, device 101 may broadcast the code together with a public key for establishing an encrypted connection.

Figure 2:
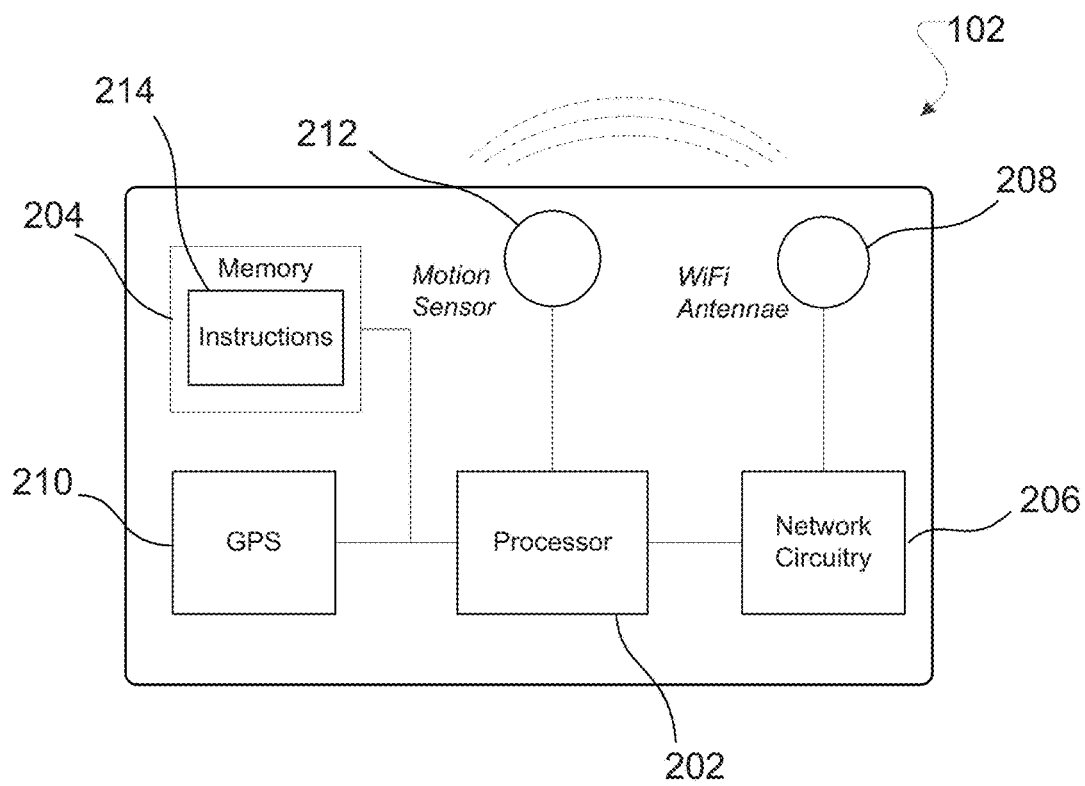
FIG. 2 depicts an example computing device, including example components for generating activity data and performing remote actions based on the activity data.

FIG. 2 depicts an example computing device 102, including example components for generating activity data and performing remote actions based on the activity data, according to one or more aspects of the subject technology. An example computing device 102 includes a processor 202, a memory 204, network circuitry 206, WiFi Antennae 208, a GPS device 210, and one or more motion sensors 212. As will be described further, motion sensors 212 may be configured to detect movement of a mobile device that device 102 or one or more components thereof. A motion sensor 212 may generally refer to any device capable of sensing a physical movement of hardware, including an integrated or connectable accelerometer, gyroscope, a proximity sensor, camera configured to detect motion, etc.

Processor 202 may execute instructions 214, stored in memory 204, to operate GPS 210 and/or sensors 212 to detect motion (e.g., movement) of computing device 102, and to detect patterns of user activity over a period of time. Motion may be detected by any of sensors 212, e.g., an accelerometer, gyroscope, compass, or by GPS-based location sensors 210, or combination thereof. Additionally or in the alternative, device 102 may be able to determine a distance and direction of movement based on the sensor data collected by sensors 212, e.g., based on a calculation including a detected acceleration from an accelerometer (212) over a duration of time. The distance of movement may be supplemented based on an orientation during the acceleration of computing device 102 read from the gyroscope or compass.

Data collected from GPS 210 and/or sensors 212 may be analyzed and patterns of sensor activity may be determined from the data. The determined sensor activity patterns may be anonymously stored (e.g., in memory 204 or in remote storage 104). In one or more implementations, sensor activity patterns include sensor data (e.g., raw sensor data). In one or more implementations, a sensor activity pattern includes a signature of a group of sensor data collected from, e.g., one or more sensors 212 and/or GPS 210. Device 102 may include one or more menus for deactivating or opting out of the storage of sensor activity patterns. These menus may be accessible, e.g., from user interface 108. As will be described further, the sensor activity patterns may be used to anticipate future interactions between a user of device 102 and remotely situated device 101, and to further determine whether device 101, or the associated hardware, is or should be in normal, power-saving, or warming state.

With reference to FIG. 1, periods of time in which computing device 101 is being used may also be determined. For example, device 101 may detect patterns of user interaction by way of a group of sensors on device 101. For example, computing device 101 may sense touch by way of a touch screen, proximity of a user by way of a proximity sensor or camera activated to detect motion, motion sensors, or input by way of a keyboard or pointing device, or by way of other user-based commands and input. These user interactions patterns may be used to determine periods of time in which computing device 101 is activated from a light sleep (e.g., only the screen off) or deep sleep with one or more components being provided limited power.

The user-interaction patterns determined by device 101 may also be stored (e.g., in memory 404 or in remote storage 104). Computing device 101 may include one or more menus for deactivating or opting out of the storage of user-interaction patterns.

The sensor activity patterns determined at device 102 may be compared to the user-interaction patterns determined at device 101 to determine whether one or more of the sensor activity patterns from device 102 correlate with the intent of a user to use or discontinue use of computing device 101. For example, a first pattern or sensor readings leading up to a prior use of computing device 101 may be determined from sensors 212 at computing device 102. The sensor readings may include data from an accelerometer, gyroscope, compass, motion, camera, etc. Additionally or in the alternative, the first pattern may include a series of GPS or other location readings moving closer or farther from device 101 immediately before or after it is used, respectively.

Sensor activity patterns and user interaction patterns may be stored for certain portions of a day or a specific range of time (e.g., hours, minutes, etc.) throughout the day. A different sensor activity patterns may also be associated with different ranges of time. In some aspects, the various patterns may be determined and/or stored for a range of time periods over a number of days. For example, system 100 may determine (e.g., by way of sensors 212) that, for Monday through Friday, a user moves away from device 102 at or around 11:00 pm and device 101 remains in a power-saving mode between 11:00 pm and 6:30 am, at which the user returns. The same may be determined for the hours of 12:00 pm and 1:00 pm. Computing device 101 may be determined to be in the power-saving mode at different times on Saturdays and Sundays.

Once a user-interaction pattern for device 101 has been established (e.g., after a predetermined number of periods in which the system is in the power-saving mode), system 100 may determine appropriate times to wake certain components of device 101 during idle times based on the detection of sensor activity patterns. For example, device 102 may receive a pattern of sensor readings and correlate the received pattern with a stored pattern to determine that the user of device 102 intends to use device 101. Based on this determination, device 101 may switch from a power-savings mode to a warming mode to initialize normal operation of the device before the user begins use of device 101.

Computing device 101 may be in a normal mode in which most if not all components of device 101 are powered and all software activities that ready device 101 for use have been completed (e.g., software has been cached and/or loaded into the appropriate places in random-access memory (RAM)). Device 101 may enter the normal mode by way of the detection of user interactions (e.g., by way of user input). Device 101 may receive a newly detected sensor activity pattern from device 102 and correlate the pattern with a stored pattern to determine that the user of device 102 intends to discontinue use of device 101. Device 101 may then be switched from the normal mode to the power-saving mode based on this determination.

Based on user-interaction patterns determined by device 101 (e.g., after a predetermined number of periods in which the system transitions between the powered-down, warming, and/or normal states), device 101 may determine periods of time in which device 101 is expected to be in power-savings mode. In one example, computing device 100 may predict that the system will be in a powered-down state between 11:00 pm and 7:00 am. When in power-savings mode during this time, or a predetermined time before the power-savings mode is anticipated to end, device 101 may activate network circuitry 206 to facilitate a connection to device 102. Device 101 may automatically connect to network 107 and, on receiving activity data, including or representative of a predetermined sensor activity pattern, begin warming without waking other components of device 101 whose power has been limited.

In one or more implementations, device 101 may keep network circuitry 206 active while in the power-savings mode to monitor network 107 for activity data, including predetermined sensor activity patterns. In one or more implementations, computing device 101 may periodically wake network circuitry 206 while in the power-savings mode to receive activity data. When communication with device 102 during power-savings mode, device 101 may not wake (e.g., provide power to) a display during and after communication with device 102. Instead, when a predetermined sensor activity pattern is determined from the activity data, device 101 may quietly begin loading all the required programs into memory so that device 101 is ready for use by the user. Other components having limited power by way of the power-savings mode may be powered and activated at the same time or when device 101 receives user interaction to place device 101 in normal mode.

With reference to FIG. 1, communication between device 101 and device 102 during power-savings mode of device 101 may occur in various ways. In one or more implementations, activity data may be received by device 101 from server 103. In this regard, device 102 may periodically upload the activity data to server 103. e.g., for storage in storage 104 in connection with user account 105. Device 101 may periodically poll server 103 for activity data. In one or more implementations, server 103 may push activity data to device 101 when the activity data becomes available to server 103 (e.g., by way of being uploaded by device 102), or when a predetermined pattern is detected within the activity data. In one or more implementations, device 101 connects directly to device 102. For example, device 101 and device 102 may automatically pair over Bluetooth when within range of the Bluetooth connection, or the devices may connect over the same WiFi access point or LAN.

Figure 3:
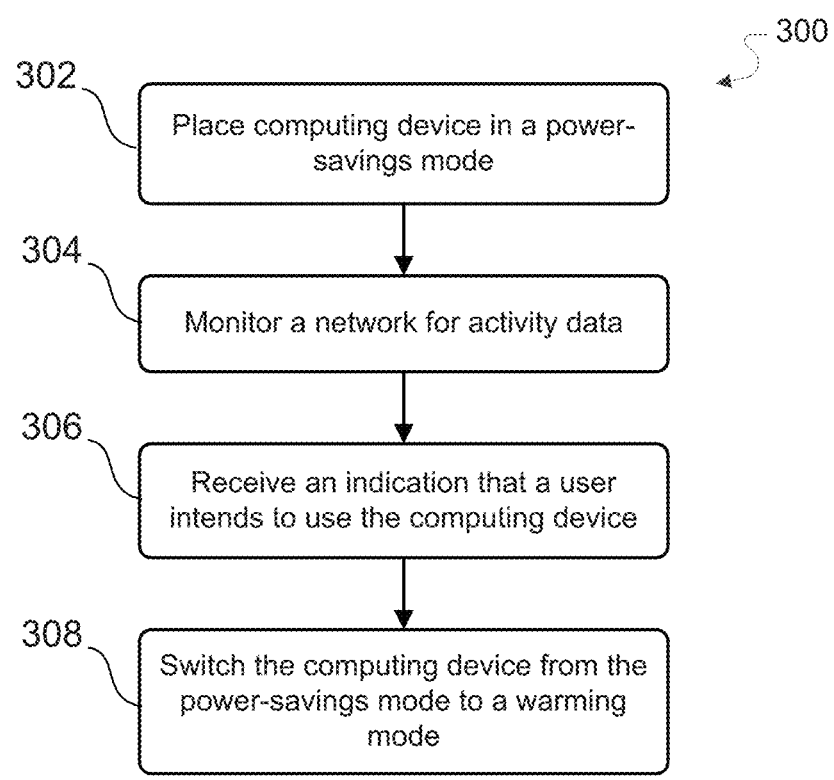
FIG. 3 depicts a flow diagram of a first example process for performing actions in a computing device based on sensor data from remote devices.

FIG. 3 depicts a first example process 300 for performing actions in a computing device based on sensor data from remote devices, according to aspects of the subject technology. For explanatory purposes, example process 300 is described herein with reference to the components of FIGS. 1, 2, and 5. Further for explanatory purposes, the blocks of example process 300 are described herein as occurring in serial, or linearly. However, multiple blocks of example process 300 may occur in parallel. In addition, the blocks of example process 300 need not be performed in the order shown and/or one or more of the blocks of example process 300 need not be performed.

In the depicted example flow diagram, computing device 101 is placed into a power-savings mode (302). When the power-saving mode is initiated, an operational state of the computing device is saved in connection with power to one or more components of the computing device being limited. For example, device 101 may turn off or pause a hard drive or optical disc player, and may store one or more open documents and programs in memory in non-volatile memory (e.g., on a hard disk). Device 101 then remains in a low-power state to save power while maintaining readiness to activate and power-up quickly upon detection of user-interaction with the device.

While in power-saving mode, device 101 may monitor (e.g., by way of network circuitry 206) network 107 for activity data associated with device 102 (304). Activity data may include, e.g., data representative of sensor activity patterns or sensor data for which such patterns may be determined. The activity data may be uploaded to server 103 by devices (e.g., device 102) linked to user account 105. In various aspects, user 106 may, in connection with registering device 102 with user account 105, authorize device 102 to take sensor readings and upload the sensor readings as the activity data to server 103. Device 101 may, e.g., periodically poll server 103 to determine if the activity data has been made uploaded or otherwise made available to server 103 by device 102.

In one or more implementations, network 107 may include personal area networks established by way of direct wireless interaction between device 101 and device 102. The devices also may communicate directly through a LAN. In this regard, device 101 may monitor network 107 for the presence of device 102 on the network, automatically connect with device 102 (e.g., via Bluetooth) and receive the activity data from device 102 directly.

In one or more implementations, placing device 101 in a power-saving mode includes limiting power to network circuitry 206 of device 101. To monitor network 107 for the activity data, network circuitry 206 may be activated to facilitate a connection to device 102 over network 107, without activating other components of device 101 whose power has been limited. For example, power to a display screen of device 101 may be suspended. The display screen may remain without power when network circuitry 206 is activated to receive the activity data. The display screen may also remain inactive while power is restored to one or more other components when device 101 enters warming mode, and during the time that loading of the operational state is initiated. The display screen may remain inactive until user-interaction with device 101 is detected, at which time device 101 may enter the normal mode.

Based on the monitoring for activity data, device 101 may receive (e.g., from device 102 or server 103) an indication that a user of device 102 intends to use device 101 (306). In this regard, the activity data may be compared to one or more predetermined patterns of user interaction with device 101, and the indication determined based on the comparison.

In one or more implementations, a first pattern of sensor readings received from device 102 for a first period of time leading up to a prior use of device 101 is determined. For example, the first pattern of sensor readings may be a specific order of readings taken from a specific combination of sensors that is received before device 101 receives user interaction. The first pattern may be stored in a form that may be indexed at a later time. The indication that the user intends to use the device may be based on, e.g., receiving a second pattern of sensor readings and correlating the second pattern of sensor readings with the first pattern of sensor readings.

In one or more implementations, device 102 may provide location data to server 103 and/or device 101. The first indication may be based on, e.g., determining that the location data indicates that mobile device is moving closer to the computing device. In one or more implementations, device 101 may determine its current location device using a global positioning system (GPS). For example, device 101 may be fitted with a GPS device and receive GPS coordinates for its current location. These coordinates may be provided to server 103. In this regard, determining that the mobile device has moved to within a threshold distance of the current location may be based on the comparing the GPS coordinates for the current location of device 101 with GPS coordinates for the current location of device 102. In one or more implementations, the first indication is based on the location data associated with device 102 and motion-related activity sensed by device 102.

Based on receiving the first indication that a user of device 102 intends to use device 101, device 101 switches from the power-saving mode to a warming mode (308). As described previously, the warming mode may include, e.g., restoring power to the one or more components and initiating loading the operational state of the computing device before the user physically interacts with the computing device.

In one or more implementations, the warming mode may also include receiving one or more updates to one or more respective applications operating on the computing device. For example, an application may periodically poll respective servers associated with the application while the device is in the normal mode. When the device enters into the power-savings mode, such polling may be disabled. However, the polling may be initiated upon the device entering into the warming mode. Additionally or in the alternative, during the warming mode, computing device 101 may determine that device 102 received an update to one or more applications operating on device 102 that are also operating on device 101. For example, user account 105 may store version information for each account-lined device and a time in which an update to software was performed on each device. Based on device 101 determining that one or more updates were performed on device 102 during a period of time (e.g., within a thirty-minute window prior to receiving the indication that the user intends to use device 101), device 101 may initiate the same update(s) on device 101.

Figure 4:
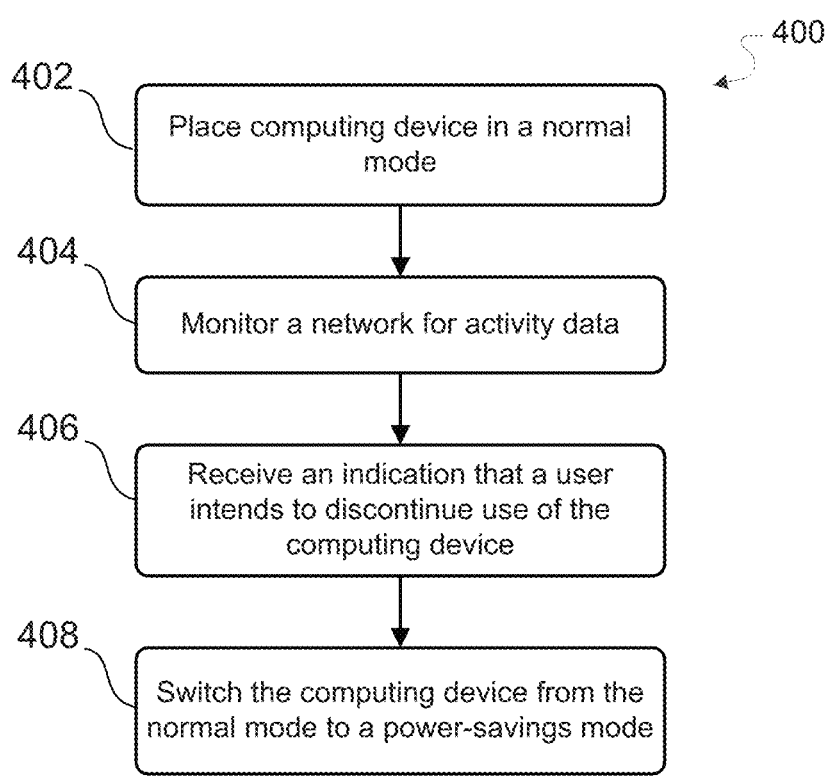
FIG. 4 depicts a flow diagram of a second example process for performing actions in a computing device based on sensor data from remote devices.

FIG. 4 depicts a second example process 400 for performing actions in a computing device based on sensor data from remote devices, according to aspects of the subject technology. For explanatory purposes, example process 400 is described herein with reference to the components of FIGS. 1, 2, and 5. Further for explanatory purposes, the blocks of example process 400 are described herein as occurring in serial, or linearly. However, multiple blocks of example process 400 may occur in parallel. In addition, the blocks of example process 400 need not be performed in the order shown and/or one or more of the blocks of example process 400 need not be performed.

In the depicted example flow diagram, computing device 101 is placed into a normal mode (402). The normal mode may be initiated or maintained by way of user interaction with device 101. In the depicted example, the normal mode includes the components of device 101 being powered and the operational state of device 101 being loaded into the memory systems of device 101 in accordance with normal operation of the device. In various aspects, user interaction may be received, and results of the user interaction generated, while in the normal mode. While in the normal mode, device 101 may monitor (e.g., by way of network circuitry 206) network 107 for activity data associated with device 102 (404). Device 101 may monitor network 107 for the activity data using any of the previously described methods.

According to FIG. 4, based on the monitoring for activity data, device 101 may receive (e.g., from device 102 or server 103) an indication that a user of device 102 intends to discontinue use of device 101 (406). As described previously, the activity data may be compared to one or more predetermined patterns of user interaction with device 101, and the indication determined based on the comparison.

In one or more implementations, a first pattern of sensor readings received from device 102 for a first period of time following a prior use of device 101 is determined. For example, the first pattern of sensor readings may be a specific order of readings taken from a specific combination of sensors that is received after device 101 receives user interaction and in which device enters a power-savings mode for some period of time before receiving further user interaction. The first pattern may be stored in a form that may be indexed at a later time. The indication that the user intends to discontinue use of the device may be based on, e.g., receiving a second pattern of sensor readings and correlating the second pattern of sensor readings with the first pattern of sensor readings.

In one or more implementations, device 102 may provide location data to server 103 and/or device 101. The indication may be based on, e.g., determining that the location data indicates that device 102 is moving farther from device 101. In one or more implementations, device 101 may determine its current location device using GPS, and GPS coordinates of device 101 may be provided to server 103. In this regard, determining that device 102 has moved farther from device 101 may include determined that device 102 has moved outside a threshold distance of the current location based on the comparing the GPS coordinates for the current location of device 101 with GPS coordinates for the current location of device 102.

Based on receiving the indication that a user of device 102 intends to discontinue use of device 101, device 101 switches from the normal mode to the power-saving mode (408).

The blocks of example process 400 may be combined with the blocks of process 300. For example, the indication that the user of device 102 intends to discontinue use of device 101 may be received after device 101 has entered into a normal mode by way of a warming mode initiated from a received indication that the user of device 102 intended to use device 101, and vice versa.

Many of the above-described example processes 300 and 400, and related features and applications, may be implemented as software processes that are specified as a set of instructions recorded on a computer readable storage medium (also referred to as computer readable medium). When these instructions are executed by one or more processing unit(s) (e.g., one or more processors, cores of processors, or other processing units), they cause the processing unit(s) to perform the actions indicated in the instructions. Examples of computer readable media include, but are not limited to, CD-ROMs, flash drives, RAM chips, hard drives, EPROMs, etc. The computer readable media does not include carrier waves and electronic signals passing wirelessly or over wired connections.

The term "software" is meant to include, where appropriate, firmware residing in read-only memory or applications stored in magnetic storage, which can be read into memory for processing by a processor. Also, in some implementations, multiple software aspects of the subject disclosure can be implemented as sub-parts of a larger program while remaining distinct software aspects of the subject disclosure. In some implementations, multiple software aspects can also be implemented as separate programs. Finally, any combination of separate programs that together implement a software aspect described here is within the scope of the subject disclosure. In some implementations, the software programs, when installed to operate on one or more electronic systems, define one or more specific machine implementations that execute and perform the operations of the software programs.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

Figure 5:
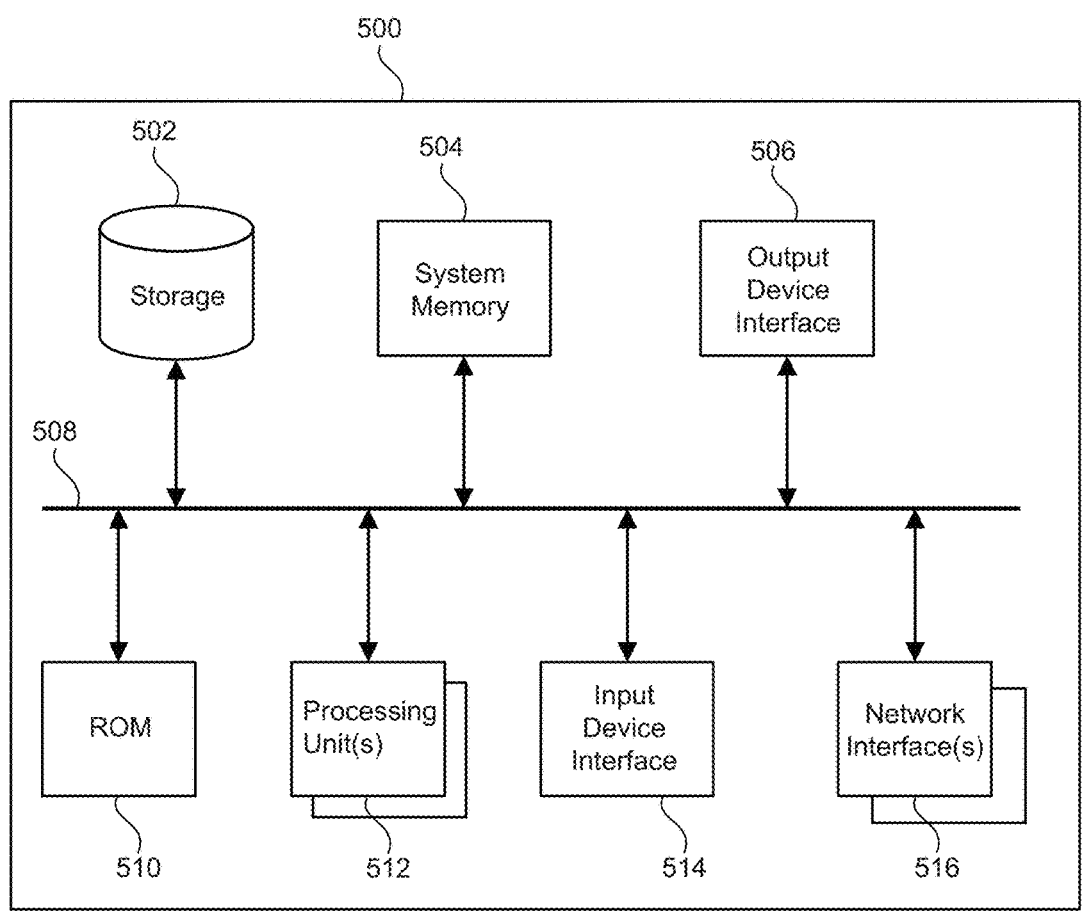
FIG. 5 is a diagram illustrating an example electronic system for use in connection with performing actions in a computing device based on sensor data from remote devices.

FIG. 5 is a diagram illustrating an example electronic system 500 for use in connection with performing actions in a computing device based on sensor data from remote devices, according to one or more aspects of the subject technology. Electronic system 500 may be a computing device for execution of software associated with one or more portions or steps of process 300 or 400, or components and processes provided by FIGS. 1-4. Electronic system 500 may be representative of computing device 101. Electronic system 500 may be representative, in combination with the disclosure regarding FIG. 2, of computing device 102. In this regard, electronic system 500 or computing device 100 may be a personal computer or a mobile device such as a smartphone, tablet computer, laptop, PDA, or other touch screen or television with one or more processors embedded therein or coupled thereto, or any other sort of computer-related electronic device having network connectivity.

Electronic system 500 may include various types of computer readable media and interfaces for various other types of computer readable media. In the depicted example, electronic system 500 includes a bus 508, processing unit(s) 512, a system memory 504, a read-only memory (ROM) 510, a permanent storage device 502, an input device interface 514, an output device interface 506, and one or more network interfaces 516. In some implementations, electronic system 500 may include or be integrated with other computing devices or circuitry for operation of the various components and processes previously described.

Bus 508 collectively represents all system, peripheral, and chipset buses that communicatively connect the numerous internal devices of electronic system 500. For instance, bus 508 communicatively connects processing unit(s) 512 with ROM 510, system memory 504, and permanent storage device 502.

From these various memory units, processing unit(s) 512 retrieves instructions to execute and data to process in order to execute the processes of the subject disclosure. The processing unit(s) can be a single processor or a multi-core processor in different implementations.

ROM 510 stores static data and instructions that are needed by processing unit(s) 512 and other modules of the electronic system. Permanent storage device 502, on the other hand, is a read-and-write memory device. This device is a non-volatile memory unit that stores instructions and data even when electronic system 500 is off. Some implementations of the subject disclosure use a mass-storage device (such as a magnetic or optical disk and its corresponding disk drive) as permanent storage device 502.

Other implementations use a removable storage device (such as a floppy disk, flash drive, and its corresponding disk drive) as permanent storage device 502. Like permanent storage device 502, system memory 504 is a read-and-write memory device. However, unlike storage device 502, system memory 504 is a volatile read-and-write memory, such a random access memory. System memory 504 stores some of the instructions and data that the processor needs at runtime. In some implementations, the processes of the subject disclosure are stored in system memory 504, permanent storage device 502, and/or ROM 510. From these various memory units, processing unit(s) 512 retrieves instructions to execute and data to process in order to execute the processes of some implementations.

Bus 508 also connects to input and output device interfaces 514 and 506. Input device interface 514 enables the user to communicate information and select commands to the electronic system. Input devices used with input device interface 514 include, e.g., alphanumeric keyboards and pointing devices (also called "cursor control devices"). Output device interfaces 506 enables, e.g., the display of images generated by the electronic system 500. Output devices used with output device interface 506 include, e.g., printers and display devices, such as cathode ray tubes (CRT) or liquid crystal displays (LCD). Some implementations include devices such as a touchscreen that functions as both input and output devices.

Finally, as shown in FIG. 5, bus 508 also couples electronic system 500 to a network (not shown) through network interfaces 516. Network interfaces 516 may include, e.g., a wireless access point (e.g., Bluetooth or WiFi) or radio circuitry for connecting to a wireless access point. Network interfaces 516 may also include hardware (e.g., Ethernet hardware) for connecting the computer to a part of a network of computers such as a local area network ("LAN"), a wide area network ("WAN"), wireless LAN, or an Intranet, or a network of networks, such as the Internet. Any or all components of electronic system 500 can be used in conjunction with the subject disclosure.

These functions described above can be implemented in computer software, firmware or hardware. The techniques can be implemented using one or more computer program products. Programmable processors and computers can be included in or packaged as mobile devices. The processes and logic flows can be performed by one or more programmable processors and by one or more programmable logic circuitry. General and special purpose computing devices and storage devices can be interconnected through communication networks.

Some implementations include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The computer-readable media can store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some implementations are performed by one or more integrated circuits, such as application specific integrated circuits (ASICs) or field programmable gate arrays (FPGAs). In some implementations, such integrated circuits execute instructions that are stored on the circuit itself.

As used in this specification and any claims of this application, the terms "computer", "server", "processor", and "memory" all refer to electronic or other technological devices. These terms exclude people or groups of people. For the purposes of the specification, the terms display or displaying means displaying on an electronic device. As used in this specification and any claims of this application, the terms "computer readable medium" and "computer readable media" are entirely restricted to tangible, physical objects that store information in a form that is readable by a computer. These terms exclude any wireless signals, wired download signals, and any other ephemeral signals.

To provide for interaction with a user, implementations of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; e.g., feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user, e.g., by sending web pages to a web browser on a user's client device in response to requests received from the web browser.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

Those of skill in the art would appreciate that the various illustrative blocks, modules, elements, components, methods, and algorithms described herein may be implemented as electronic hardware, computer software, or combinations of both. To illustrate this interchangeability of hardware and software, various illustrative blocks, modules, elements, components, methods, and algorithms have been described above generally in terms of their functionality. Whether such functionality is implemented as hardware or software depends upon the particular application and design constraints imposed on the overall system. Skilled artisans may implement the described functionality in varying ways for each particular application. Various components and blocks may be arranged differently (e.g., arranged in a different order, or partitioned in a different way) all without departing from the scope of the subject technology.

It is understood that the specific order or hierarchy of steps in the processes disclosed is an illustration of example approaches. Based upon design preferences, it is understood that the specific order or hierarchy of steps in the processes may be rearranged. Some of the steps may be performed simultaneously. The accompanying method claims present elements of the various steps in a sample order, and are not meant to be limited to the specific order or hierarchy presented.

The previous description is provided to enable any person skilled in the art to practice the various aspects described herein. The previous description provides various examples of the subject technology, and the subject technology is not limited to these examples. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the invention.

The term website, as used herein, may include any aspect of a website, including one or more web pages, one or more servers used to host or store web related content, etc. Accordingly, the term website may be used interchangeably with the terms web page and server. The predicate words "configured to", "operable to", and "programmed to" do not imply any particular tangible or intangible modification of a subject, but, rather, are intended to be used interchangeably. For example, a processor configured to monitor and control an operation or a component may also mean the processor being programmed to monitor and control the operation or the processor being operable to monitor and control the operation. Likewise, a processor configured to execute code can be construed as a processor programmed to execute code or operable to execute code.

A phrase such as an "aspect" does not imply that such aspect is essential to the subject technology or that such aspect applies to all configurations of the subject technology. A disclosure relating to an aspect may apply to all configurations, or one or more configurations. An aspect may provide one or more examples. A phrase such as an aspect may refer to one or more aspects and vice versa. A phrase such as an "embodiment" does not imply that such embodiment is essential to the subject technology or that such embodiment applies to all configurations of the subject technology. A disclosure relating to an embodiment may apply to all embodiments, or one or more embodiments. An embodiment may provide one or more examples. A phrase such as an "embodiment" may refer to one or more embodiments and vice versa. A phrase such as a "configuration" does not imply that such configuration is essential to the subject technology or that such configuration applies to all configurations of the subject technology. A disclosure relating to a configuration may apply to all configurations, or one or more configurations. A configuration may provide one or more examples. A phrase such as a "configuration" may refer to one or more configurations and vice versa.

The word "example" is used herein to mean "serving as an example or illustration." Any aspect or design described herein as "example" is not necessarily to be construed as preferred or advantageous over other aspects or designs.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for." Furthermore, to the extent that the term "include," "have," or the like is used in the description or the claims, such term is intended to be inclusive in a manner similar to the term "comprise" as "comprise" is interpreted when employed as a transitional word in a claim.

What is claimed is:

1. A computer-implemented method, comprising:
    placing a computing device in a power-saving mode, the power-saving mode comprising saving an operational state of the computing device in connection with limiting power to one or more components of the computing device;
    receiving an indication that a plurality of sensors of a mobile device produced a predetermined pattern of sensor data that was previously stored in connection with a user account associated with the mobile device and the computing device, the plurality of sensors comprising at least one of an accelerometer and a gyroscope;
    determining, based on receiving the indication, that a user of the mobile device intends to use the computing device;
    switching, based on the determining, the computing device from the power-saving mode to a warming mode, the warming mode comprising restoring power to at least one of the one or more components while at least one other of the one or more components, including a display screen, remain in the power-saving mode; and
    initiating, by the at least one of the one or more components with restored power, loading the operational state of the computing device before the user physically interacts with the computing device and while the at least one other of the one or more components, including the display screen, remain in the power-saving mode.

2. The computer-implemented method of claim 1, wherein the predetermined pattern of sensor data comprises a first pattern of user interaction with the mobile device for a first period of time leading up to a prior use of the computing device,
    wherein determining that the user of the mobile device intends to use the computing device comprises correlating a second pattern of the user interaction associated with the computing device with the first pattern of the user interaction.

3. The computer-implemented method of claim 1, wherein the predetermined pattern is based on location data associated with the mobile device, wherein determining that the user of the mobile device intends to use the computing device comprises determining that, based on the location data, the mobile device is moving closer to the computing device.

4. The computer-implemented method of claim 3, wherein the determining that the user of the mobile device intends to use the computing device is based on the location data and motion-related activity sensed by the mobile device.

5. The computer-implemented method of claim 1, wherein placing the computing device in the power-saving mode comprises limiting power to network circuitry of the computing device, and wherein the method comprises, before receiving the indication, activating the network circuitry and facilitating a connection to the mobile device over the network without activating other components of the computing device whose power has been limited.

6. The computer-implemented method of claim 5, wherein placing the computing device in the power-saving mode comprises:
    maintaining power to network circuitry of the computing device while power to the one or more components is limited.

7. The computer-implemented method of claim 1, wherein loading the operational state further comprises:
    initiating receipt of one or more updates to one or more respective applications operating on the computing device.

8. The computer-implemented method of claim 1, wherein loading the operational state further comprises:
    determining that the mobile device received an update to one or more applications operating on the mobile device that are also operating on the computing device; and
    initiating an update of the one or more applications operating on the computing device.

9. The computer-implemented method of claim 1, wherein a normal mode of the computing device comprises the one or more components being powered and the operational state being loaded, the method further comprising:
  detecting user interaction with the computing device while the computing device is in the normal mode;
  determining, based on the detection that the user of the mobile device intends to discontinue use of the computing device; and
  switching the computing device from the normal mode to the power-saving mode.

10. The computer-implemented method of claim 1, wherein the predetermined pattern of sensor data includes a first pattern of sensor readings in a specific order and taken from a specific combination of sensors of the mobile device, and wherein loading the operational state of the computing device comprises receiving user content for an application operating on the mobile device.

11. A computer-implemented method, comprising:
  placing a computing device in a normal mode, the normal mode comprising components of the computing device being powered, and an operational state of the computing device being loaded into memory systems of the computing device, in accordance with normal operation of the computing device;
  receiving a first indication that a plurality of sensors of a mobile device produced a first predetermined pattern of sensor data that was previously stored in connection with a user account associated with the mobile device and the computing device, the plurality of sensors comprising at least one of an accelerometer and a gyroscope;
  determining, based on receiving the first indication, that the user associated with the user account intends to discontinue use of the computing device;
  switching, based on the determining, the computing device from the normal mode to a power-saving mode, wherein the power-saving mode comprises saving the operational state of the computing device in connection with limiting power to at least one of one or more components of the computing device while at least one other of the one or more components, including a display screen, remain in the power-saving mode.

12. The computer-implemented method of claim 11, wherein receiving the method further comprises: comparing a first pattern of user interaction based on data from at least one sensor of the mobile device and a second pattern of the user interaction based on data from at least one sensor of the computing device.

13. The computer-implemented method of claim 12, wherein the predetermined pattern of sensor data comprises a first pattern of user interaction for a first period of time following a prior use of the computing device, and
  wherein determining that the user of the mobile device intends to discontinue use of the computing device comprises correlating a second pattern of user interaction associated with the computing device with the first pattern of the user interaction.

14. The computer-implemented method of claim 11, wherein the predetermined pattern is based on location data associated with the mobile device, wherein the determining that the user of the mobile device intends to discontinue use of the computing device comprises determining that, based on the location data, the mobile device is moving away from the computing device.

15. The computer-implemented method of claim 14, wherein the determining that the user of the mobile device intends to discontinue the computing device is based on the location data and motion-related activity sensed by the mobile device.

16. The computer-implemented method of claim 11, the method further comprising:
  receiving a second indication that the plurality of sensors of the mobile device produced a second predetermined pattern of sensor data that was previously stored in connection with a user account associated with the mobile device and the computing device, the plurality of sensors comprising at least one of an accelerometer and a gyroscope;
  determining, based on receiving the second indication, that a user of the mobile device intends to use the computing device;
  switching the computing device from the power-saving mode to a warming mode, the warming mode comprising restoring power to at least one of one or more components while at least one other of the one or more components, including a display screen, remain in the power-saving mode; and
  initiating, by the at least one of the one or more components with restored power, loading the operational state of the computing device before the computing device receives a physical interaction and while the at least one other of the one or more components, including the display screen, remain in the power-saving mode.

17. The computer-implemented method of claim 11, further comprising, when the computing device is in the power-savings mode:
  maintaining power to network circuitry of the computing device while power to the one or more components is limited.

18. A non-transitory machine-readable medium including instructions stored thereon that, when executed by a computing device, cause the computing device to:
  place the computing device in a power-saving mode, the power-saving mode comprising saving an operational state of the computing device in connection with limiting power to one or more components of the computing device;
  receiving an indication that a plurality of sensors of a mobile device produced a predetermined pattern of sensor data that was previously stored in connection with a user account associated with the mobile device and the computing device, the plurality of sensors comprising at least one of an accelerometer and a gyroscope;
  determine, based on receiving the indication, that a user of the mobile device intends to use the computing device;
  switch, based on the determining, the computing device from the power-saving mode to a warming mode, the warming mode comprising restoring power to at least one of the one or more components while at least one other of the one or more components, including a display screen, remain in the power-saving mode; and
  initiating, by the at least one of the one or more components with restored power, loading the operational state of the computing device before the user physically interacts with the computing device and while the at least one other of the one or more components, including the display screen, remain in the power-saving mode.

19. The non-transitory machine-readable medium of claim 18, the instructions further cause the computing device to:

place the computing device in a normal mode, wherein a normal mode of the computing device comprises the one or more components being powered and the operational state being loaded;

receive a second indication that the plurality of sensors of the mobile device produced a second predetermined pattern of sensor data that was previously stored in connection with a user account associated with the mobile device and the computing device;

determine based on receiving the second indication, that the user of the mobile device intends to discontinue use of the computing device; and switch the computing device from the normal mode to the power-saving mode.

20. The non-transitory machine-readable medium of claim 18, wherein the predetermined pattern of sensor data includes a first pattern of sensor readings in a specific order and taken from a specific combination of sensors of the mobile device, and wherein loading the operational state of the computing device comprises receiving user content for an application operating on the mobile device.

\* \* \* \* \*